United States Patent
Zhang

(10) Patent No.: US 11,978,927 B2
(45) Date of Patent: May 7, 2024

(54) BATTERY MODULE AND ISOLATING MEMBER

(71) Applicant: Contemporary Amperex Technology Co., Limited, Ningde (CN)

(72) Inventor: Hua Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 577 days.

(21) Appl. No.: 17/145,602

(22) Filed: Jan. 11, 2021

(65) Prior Publication Data

US 2021/0135323 A1    May 6, 2021

Related U.S. Application Data

(63) Continuation of application No. PCT/CN2020/085439, filed on Apr. 17, 2020.

(30) Foreign Application Priority Data

Jun. 28, 2019 (CN) .......................... 201921001878.1

(51) Int. Cl.
  *H01M 50/588* (2021.01)
  *H01M 50/204* (2021.01)
  *H01M 50/291* (2021.01)

(52) U.S. Cl.
  CPC ....... *H01M 50/588* (2021.01); *H01M 50/204* (2021.01); *H01M 50/291* (2021.01)

(58) Field of Classification Search
  CPC ............. H01M 50/588; H01M 50/204; H01M 50/291; H01M 50/211; H01M 50/507; H01M 50/557; H01M 50/593; Y02E 60/10
  See application file for complete search history.

(56) References Cited

U.S. PATENT DOCUMENTS

2020/0006741 A1*    1/2020  Shin .......................... B60K 6/28

FOREIGN PATENT DOCUMENTS

| CN | 107706332 A | 2/2018 |
| CN | 208208834 U | 12/2018 |
| CN | 209880719 U | 12/2019 |

(Continued)

OTHER PUBLICATIONS

International Search Report dated Jul. 20, 2020 in corresponding International application No. PCT/CN2020/085439; 6 pages.

(Continued)

*Primary Examiner* — Kiran Quraishi Akhtar
(74) *Attorney, Agent, or Firm* — Kilpatrick Townsend & Stockton LLP

(57) ABSTRACT

Embodiments of the present application provide a battery module and an isolation member, the battery module includes: a plurality of battery cells, the battery cells having electrical connection terminals; and an isolating member, the isolating member being set at an end of the battery module along a length direction, where along the length direction, the isolating member has an outer end surface away from the battery cells and an inner end surface close to the battery cells, the isolating member is provided with through holes, the through holes penetrate the inner end surface and the outer end surface, and the electrical connection terminals of the battery cells protrude from the through holes; where the outer end surface is provided with position limiting parts.

12 Claims, 8 Drawing Sheets

(56) References Cited

FOREIGN PATENT DOCUMENTS

| | | |
|---|---|---|
| EP | 2315297 A1 | 4/2011 |
| KR | 20150052755 A | 5/2015 |
| WO | 2018186660 A1 | 10/2018 |
| WO | WO2018/186660 * 10/2018 | ............ H01M 10/48 |

OTHER PUBLICATIONS

European Supplementary Search Report dated Jul. 1, 2022 with corresponding EP Application No. 20827958.8; 9 pages.

* cited by examiner

BATTERY MODULE AND ISOLATING MEMBER

CROSS-REFERENCE TO RELATED APPLICATIONS

This application is a continuation of International Application No. PCT/CN2020/085439, filed Apr. 17, 2020, which claims priority to Chinese Patent Application No. 201921001878.1, filed on Jun. 28, 2019, both of which are hereby incorporated by reference in their entireties.

TECHNICAL FIELD

The present application relates to the technical field of energy storage devices, and in particularly, to a battery module and an isolating member.

BACKGROUND

A battery module includes a housing and a plurality of battery cells located in an inner cavity of the housing, the battery cells have electrical connection terminals, and the adjacent electrical connection terminals are connected by connecting pieces to achieve electrical connection between the adjacent battery cells. In the existing battery module, after the battery cells are electrically connected, there is a risk of incorrect connection between the electrical connection terminals and the connecting pieces, thereby causing a short circuit.

SUMMARY

In view of this, an embodiment of the present application provides a battery module and an isolating member, to solve the problem of short circuit caused by the contact of the electrical connection terminals of adjacent battery cells and the contact of the electrical connection terminals and the adjacent connecting pieces in the prior art.

An embodiment of the present application provides a battery module, the battery module includes: a plurality of battery cells that have electrical connection terminals; and an isolating member that is set at an end of the battery module along a length direction, where along the length direction, the isolating member has an outer end surface away from the battery cells and an inner end surface close to the battery cells, the isolating member is provided with through holes, the through holes penetrate the inner end surface and the outer end surface, and the electrical connection terminals of the battery cells protrude from the through holes, where the outer end surface is provided with position limiting parts.

In a possible design, the position limiting parts include a first position limiting plate, and the first position limiting plate extends along the length direction.

In a possible design, along a height direction of the battery module, two ends of the first position limiting plate are both connected with a first reinforcing plate, and the first reinforcing plate is bent relative to the first position limiting plate.

In a possible design, along a width direction, the first position limiting plate is aligned with a side wall of the through hole.

In a possible design, the position limiting parts include a second position limiting plate and a third position limiting plate, and the second position limiting plate extends along the length direction; along the length direction, one end of the second position limiting plate is connected with the outer end surface, and the other end is connected with the third position limiting plate; and the third position limiting plate is bent relative to the second position limiting plate along the width direction.

In a possible design, there is an inclined surface between the third position limiting plate and the second position limiting plate; and an included angle between the inclined surface and the second position limiting plate is 90°-180°.

In a possible design, along a height direction, two ends of the second position limiting plate are both connected with a second reinforcing plate; and the second reinforcing plate is bent relative to the second position limiting plate, and the second reinforcing plate is connected with the third position limiting plate.

In a possible design, along the width direction, the second position limiting plate is aligned with a side wall of the through hole.

In a possible design, the position limiting parts is set between adjacent through holes.

In a possible design, the through holes includes a first end through hole, a second end through hole and middle through holes, the first end through hole and the second end through hole are located at two ends in the width direction, one or more of the middle through holes are located between the first end through hole and the second end through hole; and the position limiting part is set between the first end through hole and a middle through hole adjacent to it, and the position limiting part is set between the second end through hole and a middle through hole adjacent to it.

In the present application, by setting the position limiting parts in the isolating member, it is possible to isolate the electrical connection terminals protruding from adjacent through holes, so that the short circuit caused by contact between the electrical connection terminals could be prevented, and the reliability and service life of the battery module could be improved. Moreover, after setting the position limiting parts in the isolating member, there is no need to set a structure for avoiding the electrical connection terminals between the first connecting member and the second connecting member, so as to ensure that the first connecting member and the second connecting member could have a large current-flowing area, and could reduce the risk of damage due to heating of the battery module.

An embodiment of the present application further provides an isolating member, the isolating member is set at an end of the battery module along the length direction, and along the length direction, the isolating member has the outer end surface away from the battery cells and the inner end surface close to the battery cells, the isolating member is provided with the through holes, the through holes penetrate the inner end surface and the outer end surface, and an electrical connection terminal of each of the battery cells protrudes from a corresponding through hole, where the outer end surface is provided with the position limiting parts.

BRIEF DESCRIPTION OF DRAWINGS

In order to more clearly describe the technical solutions of the embodiments of the present application, the following will briefly introduce the drawings that need to be used in the embodiments. Obviously, the drawings in the following description are only some embodiments of the present application, and for those skilled in the art, other drawings can be obtained based on these drawings without creative work.

DETAILED DESCRIPTION OF EMBODIMENTS

Figure 1:
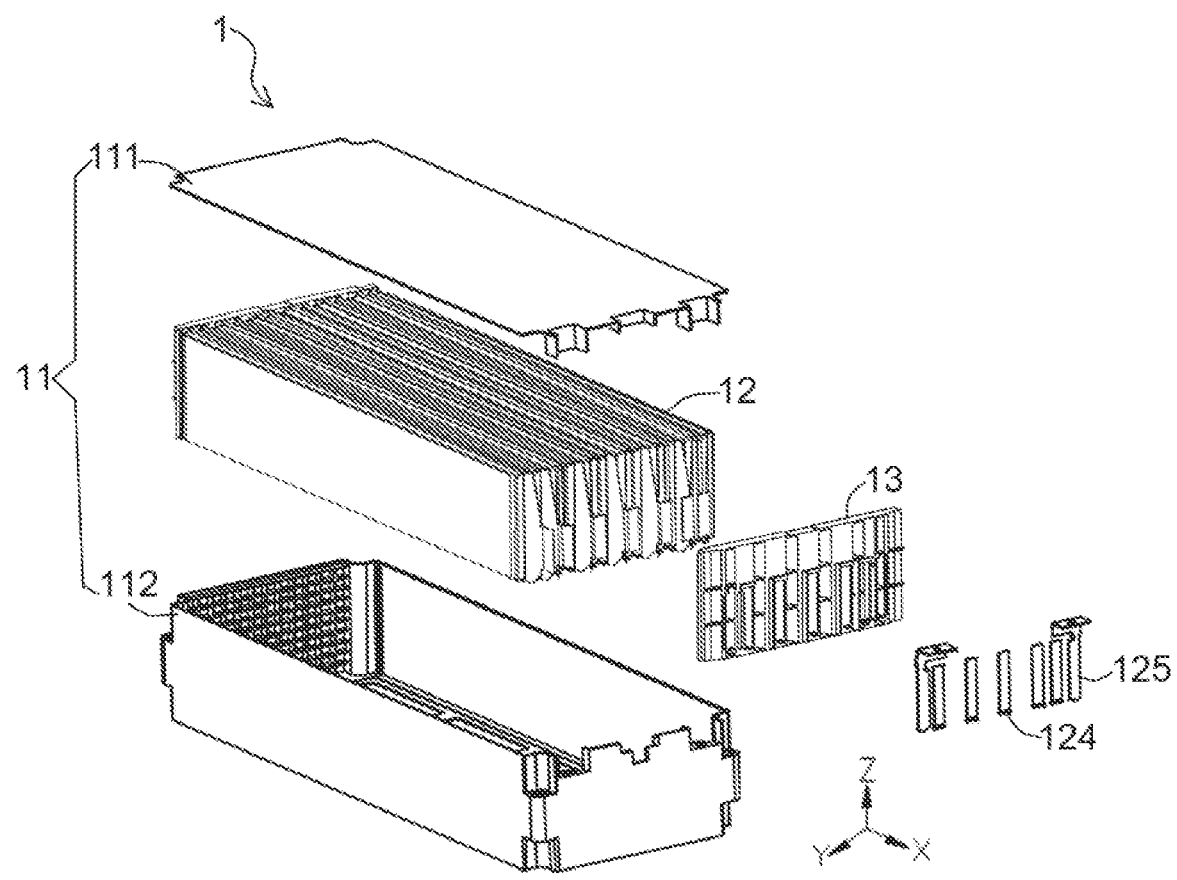
FIG. 1 is an exploded diagram of a battery module provided by the present application in a specific embodiment.

In order to better understand the technical solutions of the present application, the embodiments of the present application are described in detail below in conjunction with the accompanying drawings.

It should be clear that the described embodiments are only part of the embodiments of the present application, rather than all of the embodiments. Based on the embodiments in the present application, all other embodiments obtained by those skilled in the art without creative work are within the protection scopes of the present application.

The terms used in the embodiments of the present application are only for the purpose of describing specific embodiments, not intended to limit the present application. The singular form "a", "the" and "this" used in the embodiments of the present application and the appended claims are also intended to include plural forms, unless the context clearly indicates other meanings.

It should be understood that the term "and/or" used herein is only an association relationship describing the associated objects, which means that there may be three relationships, for example, A and/or B can mean: A alone exists, A and B exist at the same time, and B exists alone. In addition, the character "I" in the context generally means that the associated objects before and after the character are in an "or" relationship.

It should be noted that the "upper", "lower", "left", "right" and other directional words described in the embodiments of the present application are described from the perspective shown in the drawings, and should not be construed as limiting the embodiments of the present application. In addition, in the context, it should also be understood that when it is mentioned that an element is connected "on" or "under" another element, the element can not only be directly connected "on" or "under" the another element, it can also be indirectly connected "on" or "under" another element through an intermediate element.

Figure 2:
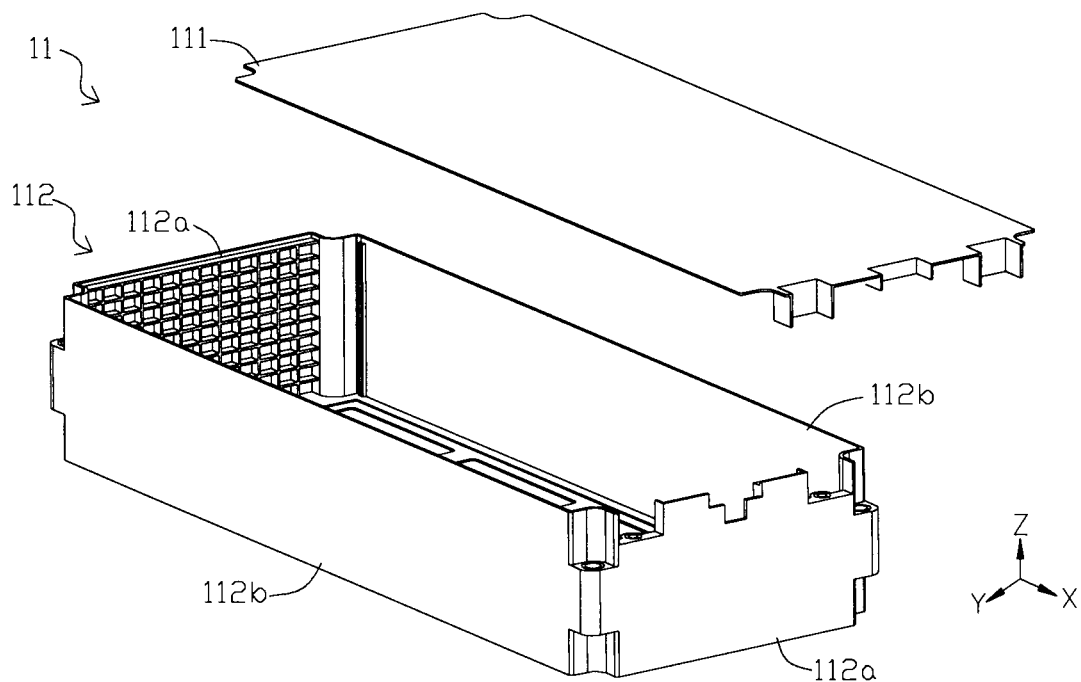
FIG. 2 is an exploded diagram of a housing assembly in FIG. 1.
Figure 3:
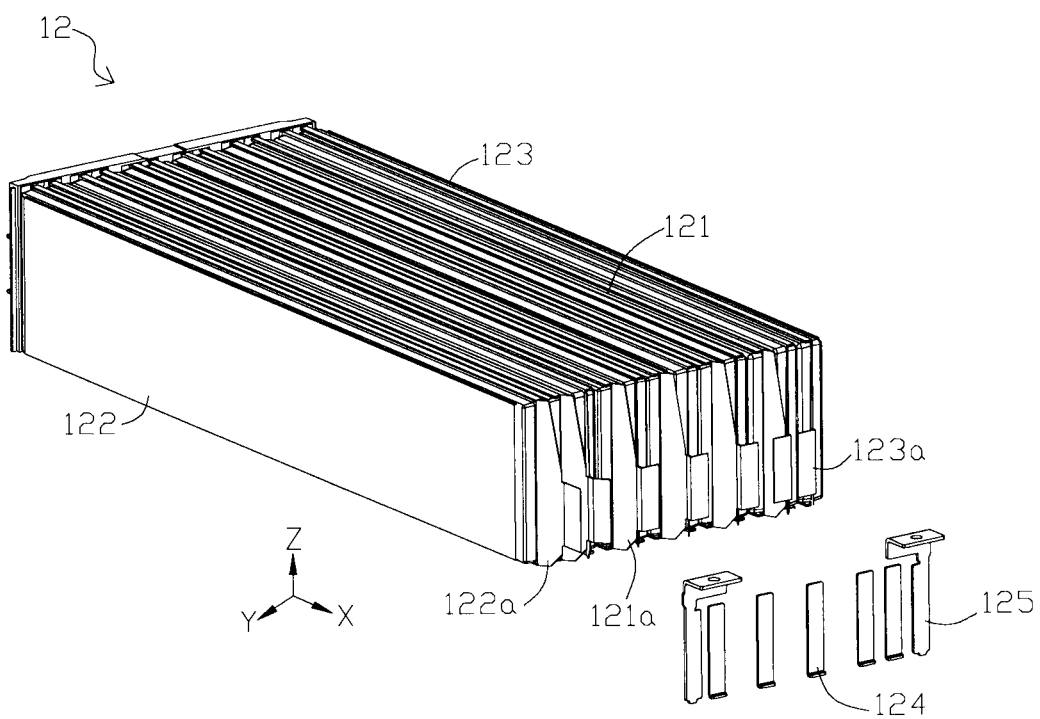
FIG. 3 is an exploded diagram of the battery assembly in FIG. 1.
Figure 4:
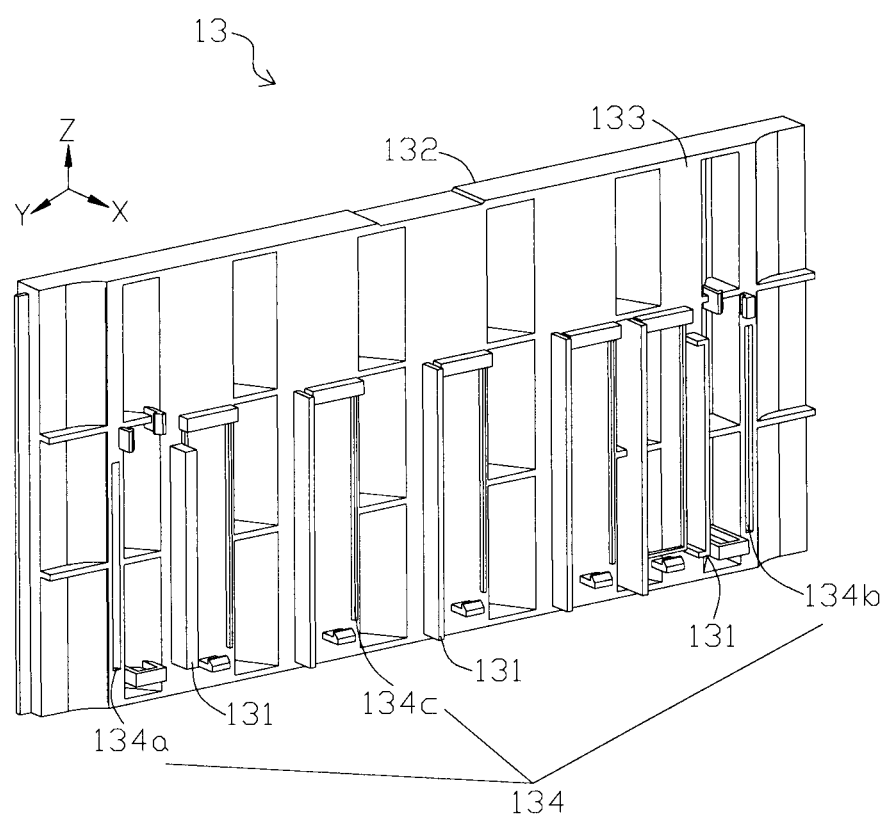
FIG. 4 is a schematic structural diagram of an isolating member in FIG. 1.
Figure 5:
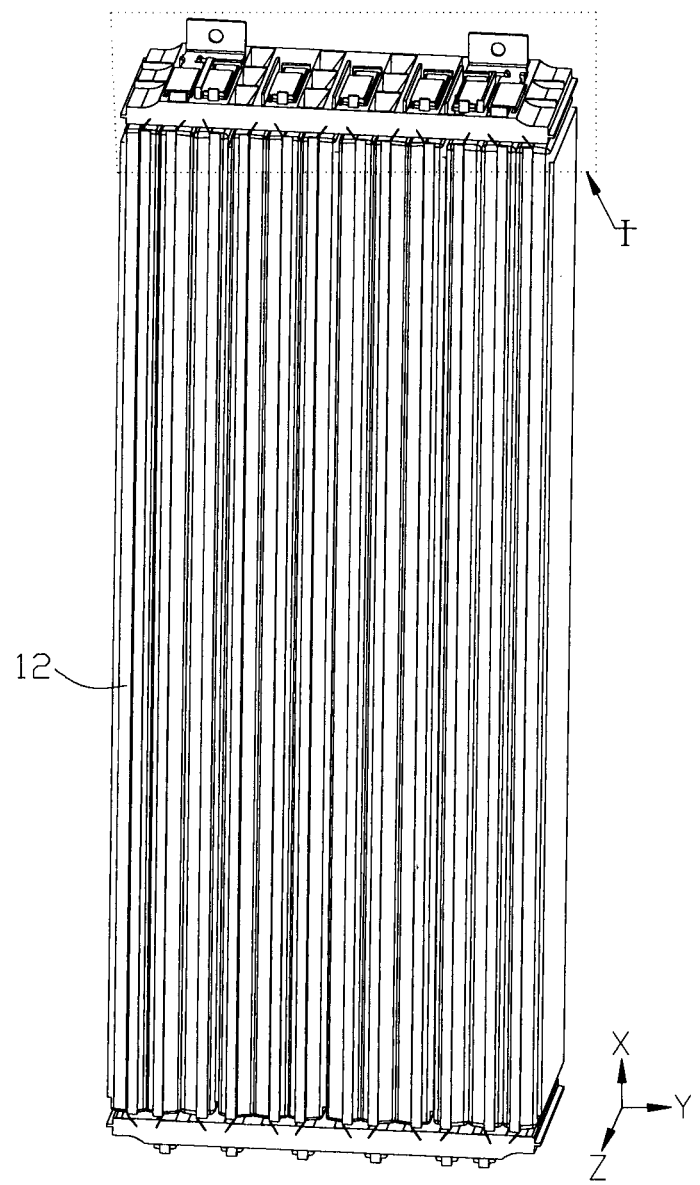
FIG. 5 is a schematic diagram of a matching structure of the battery assembly and the isolating member in FIG. 1 in a specific embodiment.
Figure 6:
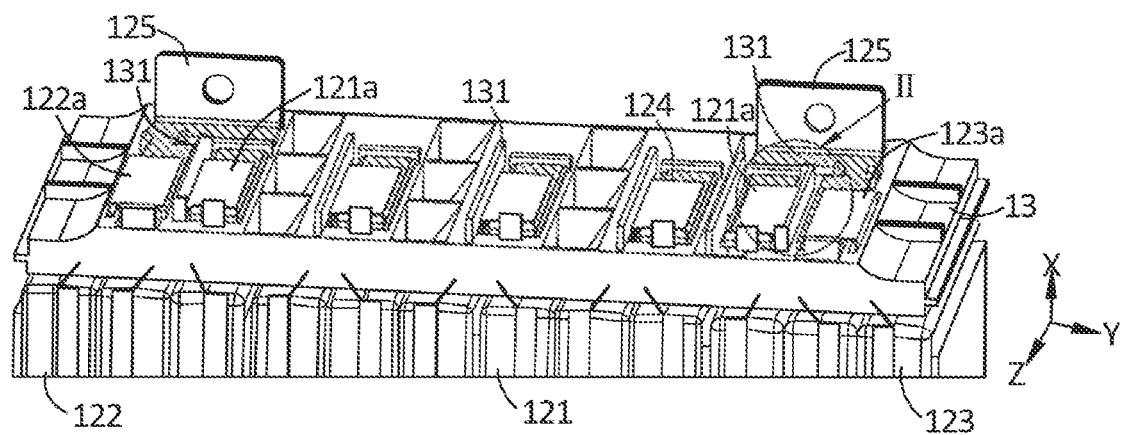
FIG. 6 is a partial enlarged diagram of part I in FIG. 5.
Figure 7:
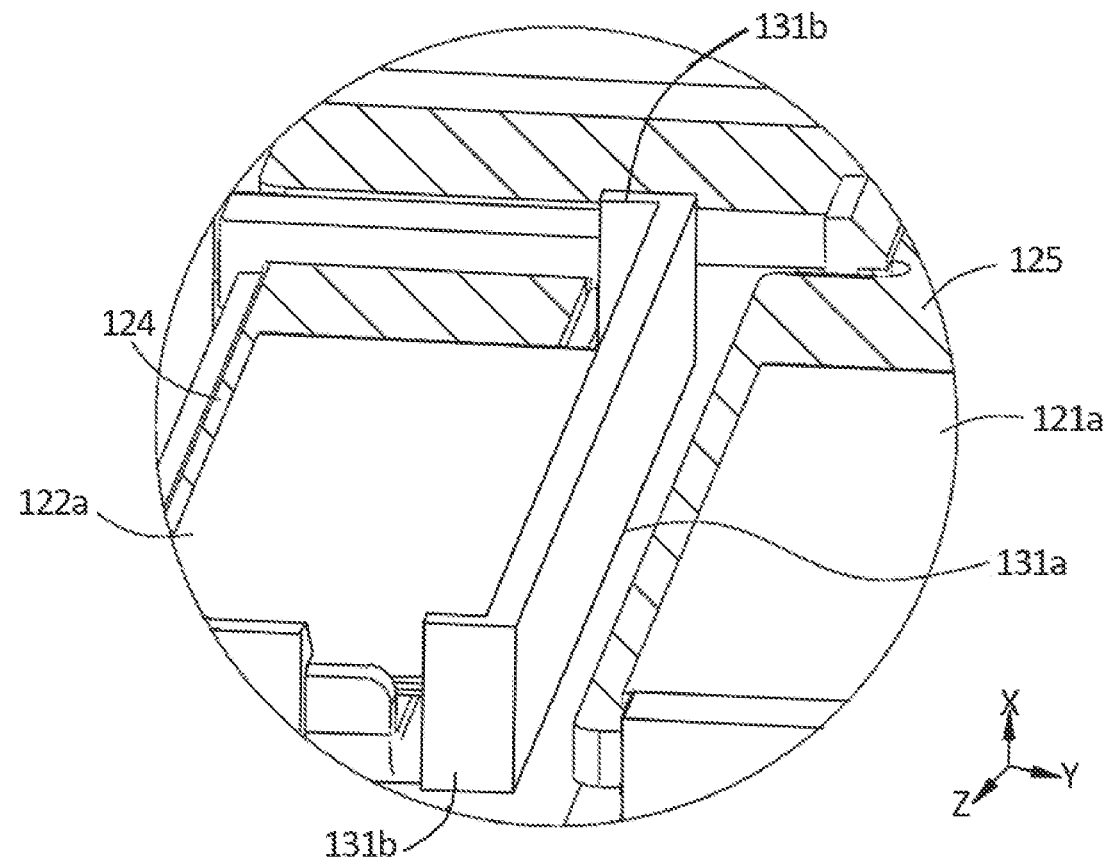
FIG. 7 is a partial enlarged diagram of part II in FIG. 6.
Figure 8:
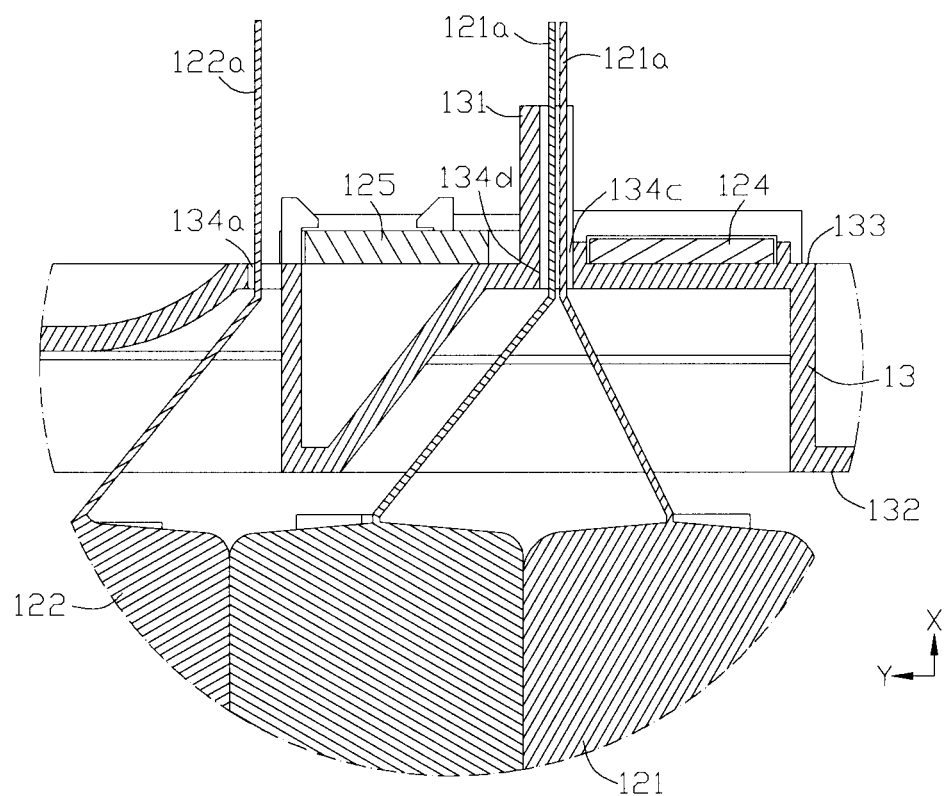
FIG. 8 is a partial cross-sectional diagram of FIG. 6.
Figure 9:
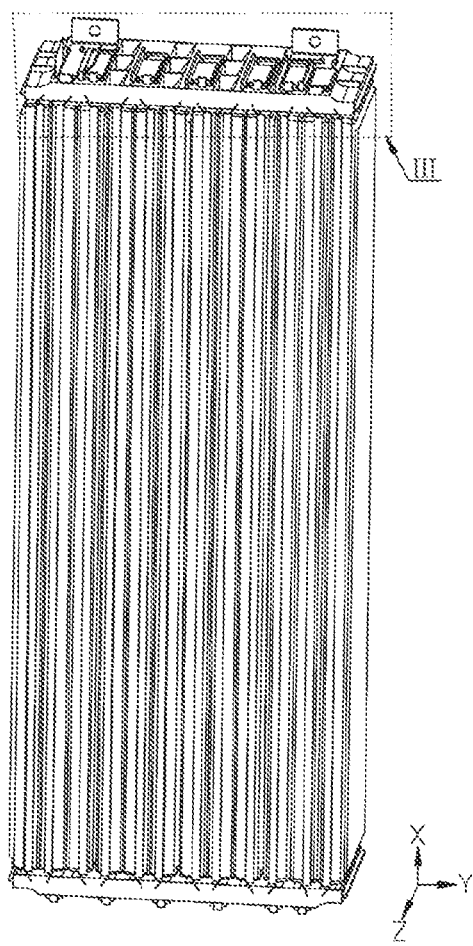
FIG. 9 is a schematic diagram of a matching structure of the battery assembly and isolating member in FIG. 1 in another specific embodiment.
Figure 10:
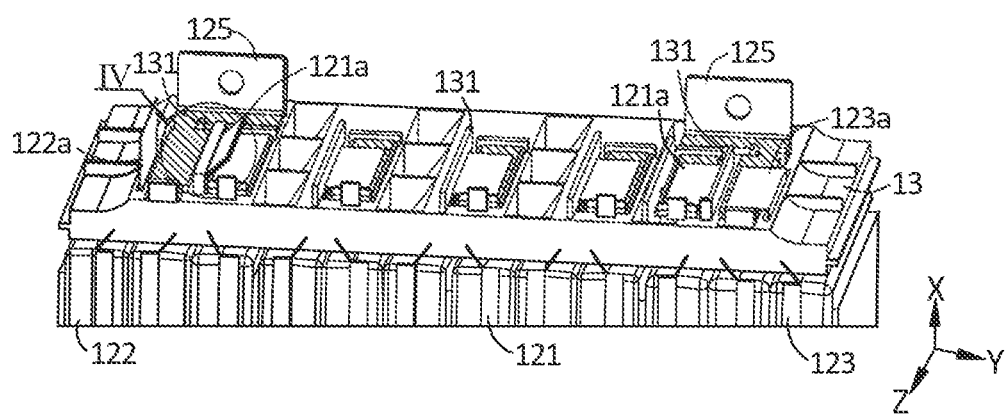
FIG. 10 is a partial enlarged diagram of part III in FIG. 9.
Figure 11:
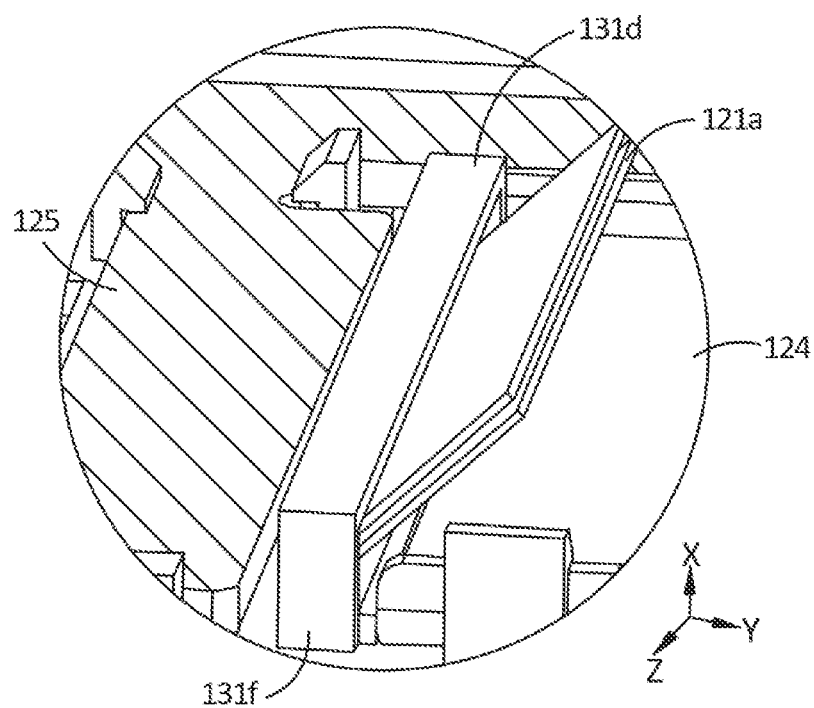
FIG. 11 is a partial enlarged diagram of part IV in FIG. 10.
Figure 12:
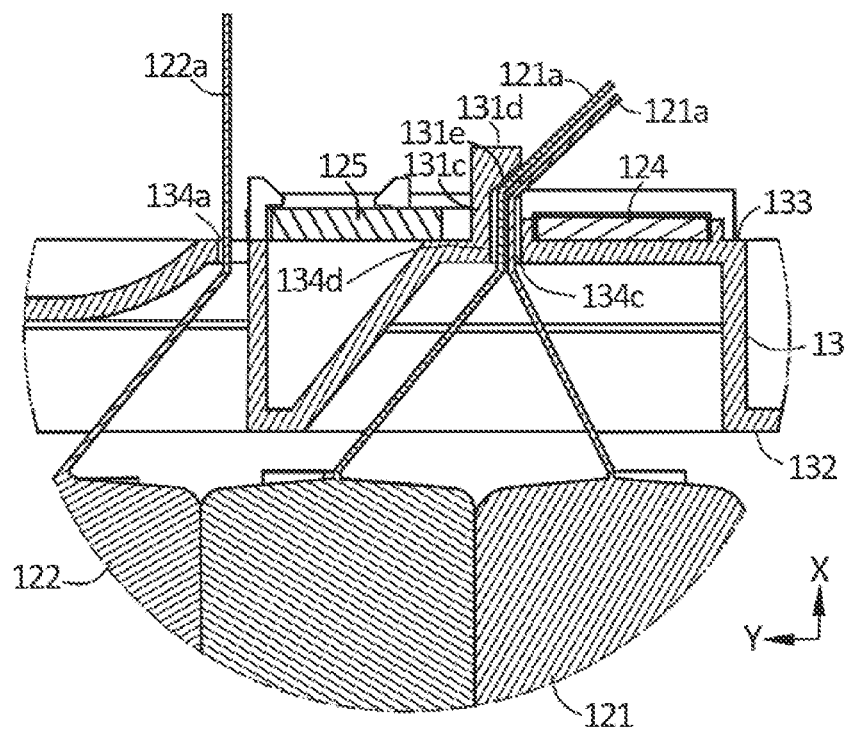
FIG. 12 is a partial cross-sectional diagram of FIG. 10.

Please refer to FIGS. 1-12, where FIG. 1 is an exploded diagram of a battery module provided by the present application in a specific embodiment; FIG. 2 is an exploded diagram of a housing assembly in FIG. 1; FIG. 3 is an exploded diagram of the battery assembly in FIG. 1; FIG. 4 is a schematic structural diagram of a isolating member in FIG. 1; FIG. 5 is a schematic diagram of a matching structure of the battery assembly and the isolating member in FIG. 1 in a specific embodiment; FIG. 6 is a partial enlarged diagram of part I in FIG. 5; FIG. 7 is a partial enlarged diagram of part II in FIG. 6; FIG. 8 is a partial cross-sectional diagram of FIG. 6; FIG. 9 is a schematic diagram of a matching structure of the battery assembly and the isolating member in FIG. 1 in another specific embodiment; FIG. 10 is a partial enlarged diagram of part III in FIG. 9; FIG. 11 is a partial enlarged diagram of part IV in FIG. 10; and FIG. 12 is a partial cross-sectional diagram of FIG. 10.

As shown in FIG. 1, an embodiment of the present application provides a battery module 1, where the battery module 1 includes a housing assembly 11 and a battery assembly 12, where as shown in FIG. 2, the housing assembly 11 may include an upper cover 111 and a lower housing 112, and the upper cover 111 and the lower housing 112 are fixedly connected to form an inner cavity of the housing assembly 11. The lower housing 112 includes two end plates 112a, two side plates 112b, and a bottom plate, which are fixedly connected and form a frame structure for accommodating the battery assembly 12 after being connected. The two end plates 112a are located at two ends of the battery assembly 12 along a length direction X, the two side plates 112b are located at two sides of the battery assembly 12 along a width direction Y, and the bottom plate is located at the bottom of the battery assembly 12.

As shown in FIG. 3, the battery assembly 12 includes a plurality of battery cells, each of the battery cells has an electrical connection terminal, and the electrical connection terminal is used to output the electrical energy of the battery cell. The battery cell in the present application can be a pouch-type battery, a square battery or a cylindrical battery. Therefore, specific structures of the battery cells are not limited in the present application.

In the battery assembly 12, adjacent battery cells are stacked along the width direction Y, and the battery assembly 12 includes a first end battery cell 122, a second end battery cell 123 and a middle battery cell 121, where the first end battery cell 122 and the second end battery cell 123 are located at two ends of the battery assembly 12 along the width direction Y, and one or more middle battery cells 121 are located between the first end battery cell 122 and the second end battery cell 123. Where the first end battery cell 122 has a first end electrical connection terminal 122a, the second end battery cell 123 has a second end electrical connection terminal 123a, and each middle battery cell 121 has a middle electrical connection terminal 121a.

At the same time, as shown in FIG. 3, the battery assembly 12 further includes first connecting members 124 and second connecting members 125, where each first connecting member 124 is used to connect an adjacent electrical connection terminal, thereby electrically connecting each of the battery cells of the battery module 1. An output pole of the battery module 1 is provided with two second connecting members 125, which are a positive second connecting member and a negative second connecting member respectively, so as to realize the output of the electric energy of the battery module 1 or the series connection of the battery module 1.

At least two electrical connection terminals, namely a positive electrical connection terminal and a negative electrical connection terminal, protrude from the battery cell. In an embodiment shown in FIG. 5, the positive electrical connection terminal and the negative electrical connection terminal respectively protrude from two ends of the battery cell along the length direction X, and when adjacent battery cells are connected in series, the adjacent electrical connection terminals protruding from the same end have opposite polarities and, connection between two electrical connection terminals located at the same end and having opposite polarities realizes a series connection of battery cells. For two adjacent battery cells in series, one ends at which they are connected are defined as connection ends.

It can be understood that when adjacent battery cells are connected in series, only one ends (the connection ends) of both them are electrically connected, and if the other ends are also electrically connected, it will cause a short circuit. One ends at which two adjacent battery cells in series are not connected are defined as non-connection ends.

Therefore, when the battery cells in the battery assembly 12 are connected in series, it is necessary to ensure that electrical connection terminals of the connection ends of adjacent battery cells are connected, and at the same time, it is also necessary to ensure that electrical connection terminals of the non-connection ends of the adjacent battery cells are not in contact.

At the same time, in the battery assembly 12, as shown in FIG. 3, when the battery cells are connected in series, two ends of each middle electrical connection terminal 121a are both connection ends, and both the first end electrical connection terminal 122a and the second end electrical connection terminal 123a have one end that is an non-connection end (not electrically connected to an adjacent middle electrical connection terminal 121a), and when the non-connection end is in contact with the adjacent middle electrical connection terminal 121a, it causes a short circuit. Therefore, it is necessary to ensure that the non-connection end of the first end electrical connection terminal 122a and the non-connection end of the second end electrical connection terminal 123a are not in contact with adjacent middle electrical connection terminals 121a and are both not in contact with a first connecting member 124 and a second connecting member 125.

As shown in FIGS. 1 and 4, two ends of the battery assembly 12 are provided with an isolating member 13 along the length direction X and the isolating member 13 is used to electrically isolate the first connecting members 124 and the second connecting members 125 from the battery cells to improve the safety of the battery module 1, and the isolating member 13 can be made of a non-metallic material such as plastic.

As shown in FIG. 4, along the length direction X, the isolating member 13 has an inner end surface 132 and an outer end surface 133, which are oppositely arranged. The inner end surface 132 is close to the battery assembly 12, and the outer end surface 133 is far away from the battery assembly 12. As shown in FIGS. 8 and 12, the isolating member 13 is provided with a plurality of through holes 134, and each through hole 134 is arranged along the width direction Y, and along the length direction X, each through hole 134 penetrates the inner end surface 132 and the outer end surface 133 of a isolating member 13, and the electrical connection terminal of each of the battery cells 121 protrudes from a corresponding through hole 134.

FIGS. 8 and 12 show an output pole of the battery assembly 12. The first connecting members 124 and the second connecting members 125 of the battery assembly 12 are both connected to the outer end surface 133 of the isolating member 13, and after the electrical connection terminals protrude from the through holes 134, the electrical connection terminals can be electrically connected to the first connecting members 124 and/or the second connecting members 125.

Specifically, the through holes 134 of the isolating member 13 include a first end through hole 134a, a second end through hole 134b, and one or more middle through holes 134c, where the first end through hole 134a and the second end through hole 134b are located at two ends of the isolating member 13 along the width direction Y, and each middle through hole 134c is located between the first end through hole 134a and the second end through hole 134b.

As shown in FIGS. 8 and 12, at the output pole, the first end electrical connection terminal 122a protrudes from the first end through hole 134a and is a non-connection end, and thus, in the first end battery cell 122, the first end electrical connection terminal protruding from one end away from the output pole is a connection end. Similarly, the second end electrical connection terminal 123a protrudes from the second end through hole 134b and is a non-connection end, the non-connection end can be located at one end of the output pole or at one end far away from the output pole. At the same time, as shown in FIG. 6, middle electrical connection terminals 121a of two adjacent middle battery cells 121 protrude from a same middle through hole 134c and are connected, and the two middle electrical connection terminals 121a protruding from the same middle through hole 134c have opposite polarities, that is, two middle electrical connection terminals 121a protrude from each middle through hole 134c.

As mentioned above, it is necessary to ensure that the first end electrical connection terminal 122a at the non-connection end is not in contact with a middle electrical connection terminal 121a adjacent thereto, the second end electrical connection terminal 123a at the non-connection end is not in contact with a middle electrical connection terminal 121a adjacent thereto, and the middle electrical connection terminals 121a protruding from different middle through holes 134c are not in contact with each other, that is, it is necessary to ensure that the electrical connection terminals protruding from different through holes 134 are all not in contact with each other. In order to achieve this purpose, the outer end surface 133 of the isolating member 13 is provided with position limiting parts 131.

In the present application, by setting the position limiting parts 131 on the isolating member 13, it is possible to isolate the electrical connection terminals protruding from adjacent through holes 134, so that the short circuit caused by contact between the electrical connection terminals could be prevented, and the reliability and service life of the battery module could be improved. Moreover, after setting the position limiting parts 131 on the isolating member 13, there is no need to set a structure for avoiding the electrical connection terminals, between the first connecting members 124 and the second connecting members 125, so as to ensure that the first connecting members 124 and the second connecting members 125 could have a large current-flowing area, and could reduce the risk of damage due to heating of the battery module.

In a possible design, when a thickness d of the battery cell is small, in order to fit the thickness of the battery cell, along the width direction Y, distances between adjacent through holes 134 are also small. Therefore, after the electrical connection terminals protrude from the adjacent through holes 134, the distance between the electrical connection terminals is small, and the risk of contact between them is great. Therefore, the position limiting parts 131 are set between the adjacent through holes 134.

Specifically, when the distances between the adjacent through holes 134 are relatively large, the distances between the electrical connection terminals protruding from the adjacent through holes 134 are relatively large, the risk of contact between the electrical connection terminals is low, and there is no need to set the position limiting parts 131.

Therefore, in the present application, it is possible to select whether to set the position limiting parts 131 according to a specific structure of the battery assembly 12, so that the weight of the battery module has a small increase to ensure energy density while the short circuit is avoided.

In the embodiments shown in FIGS. 6 and 10, along the width direction Y, both ends of the battery assembly 12 have an arc-shaped structure that is fit with the housing assembly 11. The setting of the arc-shaped structure occupies spaces of the first end electrical connection terminal 122a and the second end electrical connection terminal 123a, resulting in a small distance between the two end electrical connection terminals and the adjacent electrical connection terminals 121a, and there is a high risk of contact. Therefore, the position limiting parts 131 are set between the two ends electrical connection terminals and the middle electrical connection terminals 121a adjacent thereto, that is, a position limiting part 131 is provided between the first end through hole 134a and a middle through hole 134c adjacent thereto, and a position limiting part 131 is provided between the second end through hole 134b and a middle through hole 134c adjacent thereto.

In the present embodiment, when a distance between the adjacent middle through holes 134c is large, the position limiting parts 131 may not be set between the adjacent middle through holes 134c (or adjacent middle electrical connection terminals 121a). This not only that a false contact between the end electrical connection terminals and their adjacent middle electrical connection terminals 121a can be prevented, but also the weight of the isolating member 13 and increases the energy density of the battery module can be reduced.

In another possible design, the above-mentioned position limiting parts 131 are set between adjacent through holes 134, so as to prevent the electrical connection terminals protruding from the adjacent through holes 134 from contacting with each other, and effectively avoid the occurrence of the short circuit. At the same time, since the position limiting part 131 is set between two adjacent electrical connection terminals (that is, the position limiting parts 131 are set between the end electrical connection terminals and their adjacent middle electrical connection terminals 121a, and between adjacent middle electrical connection terminals 121a), it can increase the creeping distance and improve the electrical safety of the battery module.

Specifically, as shown in FIG. 7, the position limiting parts 131 include a first position limiting plate 131a, and the first position limiting plate 131a extends along the length direction X.

As shown in FIGS. 8 and 12, after protruding from the through holes 134, the electrical connection terminals have a risk of contact with each other when the electrical connection terminals are bent toward each other along the width direction Y. When the first position limiting plate 131a extends along the length direction X, the distances between the electrical connection terminals protruding from adjacent through holes 134 can be increased, thereby reducing the risk of contact between the electrical connection terminals. Moreover, the first position limiting plate 131a has a preset length along the length direction X, the preset length can avoid contact between the electrical connection terminals, and can also avoid the reduction of the energy density of the battery module 1 due to an excessive size of the first position limiting plate 131a.

Specifically, as shown in FIG. 7, the end surface of the first position limiting plate 131a is perpendicular to the width direction Y, so as to ensure that all parts, along a height direction Z, of the electrical connection terminals protruding from adjacent through holes 134 are not in contact with each other.

Of course, the position limiting parts 131 may also include two or more first position limiting plates, and the first position limiting plates are spaced apart along the height direction Z, thereby reducing weights of the position limiting parts 131 and increasing the energy density of the battery module 1.

At the same time, as shown in FIG. 7, along the height direction Z of the battery module 1, both ends of the first position limiting plates 131a are connected to a first reinforcing plate 131b, and two first reinforcing plates 131b are bent relative to a first position limiting plate 131a.

In the present embodiment, the set of two first reinforcing plates 131b can improve the strength and rigidity of the position limiting part 131, thereby increasing the service life of the battery module, and the two first reinforcing plates 131b can extend in the same direction or in opposite directions.

In addition, as shown in FIG. 8, along the width direction Y, the first position limiting plates 131a are aligned with side wall 134d of the through hole. Therefore, the position limiting parts 131 are a structure that extends outward from the side walls 134d of the through holes 134. After the electrical connection terminals protrude from the through holes, the first position limiting plates 131a has a function of position limiting, thereby avoiding a false contact between adjacent electrical connection terminals 121a. At the same time, in the process of the electrical connection terminals protruding from the through holes, the first position limiting plates 131a can play a guiding role, thereby avoiding a false contact between the electrical connection terminals during protruding, and improving the accuracy of the electrical connection terminals when protruding.

In another possible design, as shown in FIGS. 11 and 12, the position limiting parts 131 include a second position limiting plate 131c and a third position limiting plate 131d, where the second position limiting plate 131c extends along the length direction X, and along the length direction X, one end of the second position limiting plate 131c is connected with the outer end surface 133 of the isolating member 13, the other end is connected with the third position limiting plate 131d, and the third position limiting plate 131d is bent along the width direction Y relative to the second position limiting plate 131c.

In the present embodiment, by setting the third position limiting plate 131d bent along the width direction Y, the middle electrical connection terminals 121a can be bent towards a direction away from their adjacent first end electrical connection terminals 122a (or the second end electrical connection terminal 123a), thereby further reducing the risk of contact between the first end electrical connection terminal 122a and the middle electrical connection terminals 121a, and between the second electrical connection terminal 123a and the middle electrical connection terminals 121a.

The end surface of the second position limiting plate 131c is perpendicular to the width direction Y, so as to ensure that all parts, along the height direction Z, of the electrical connection terminals protruding from adjacent through holes 134 are not in contact with each other, and after setting the third position limiting plate 131d, the size of the second position limiting plate 131c along the length direction X can be reduced, so that the position limiting parts 131 can be applied to the battery module 1 with a limited space in the length direction X. Moreover, after protruding, the middle electrical connection terminals 121a, under the action of the third position limiting plate 131d, can bend along the width direction Y and stay away from the first end electrical connection terminal 122a (or the second end electrical connection terminal 123a), thereby further avoiding contact between the middle electrical connection terminals 121a and the first end electrical connection terminal 122a (or the second end electrical connection terminal 123a).

Of course, the position limiting parts 131 may also include two or more second position limiting plates, and the second position limiting plates are spaced apart along the height direction Z. Similarly, the position limiting parts may also include two or more third position limiting plates, and the third position limiting plates are spaced apart along the height direction Z, and the second position limiting plates are fixedly connected to corresponding third position limiting plates, thereby reducing the weight of the position limiting parts 131 and increasing the energy density of the battery module 1.

In a possible design, as shown in FIG. 12, the third position limiting plate 131d and the second position limiting plate 131c are connected by an inclined surface 131e, and the inclined surface 131e is inclined along the width direction Y of the battery module 1.

In the present embodiment, as shown in FIG. 12, after setting the inclined surface 131e, the middle electrical connection terminals 121a after protruding from the middle through holes 134c can be attached to the inclined surface 131e, thereby providing support for the middle electrical connection terminals 121a and improving their structural strength.

Specifically, as shown in FIG. 12, an included angle between the inclined surface 131e and the second position limiting plate 131c is 90°-180°, that is, an obtuse angle is formed between the inclined surface 131e and the second position limiting plate 131c, for example, the included angle may be 120°.

In the present embodiment, when the obtuse angle is formed between the inclined surface 131e and the second position limiting plate 131c, a bending angle of the middle electrical connection terminals 121a can be reduced, a stress concentration could be reduced, and its structural strength could be improved.

Further, as shown in FIG. 11, along the height direction Z, two ends of the second position limiting plate 131c are connected with a second reinforcing plate 131f, the two second reinforcing plates 131f are bent relative to the second position limiting plate 131c, and the set of the two second reinforcing plates 131f can improve the strength and rigidity of the position limiting part 131, thereby increasing the service life of the battery module, and the two second reinforcing plates 131f can extend in the same direction or in opposite directions.

The second reinforcing plate 131f is also fixedly connected to the third position limiting plate 131d in addition to being fixedly connected to the second position limiting plate 131c, the position limiting part 131 as a whole could be connected and the structural strength of the position limiting part 131 could be further improved.

In addition, as shown in FIG. 12, along the width direction Y, the second position limiting plate 131c is aligned with a side wall 134d of the through hole. Therefore, the position limiting parts 131 is a structure that extends outward from side walls 134d of the through holes. After the electrical connection terminals protrude from the through holes, the first position limiting plates 131c has a function of position limiting, thereby avoiding a false contact between adjacent electrical connection terminals. At the same time, in the process of the electrical connection terminals protruding from the through holes, the first position limiting plates 131c can play a guiding role, thereby avoiding a false contact between the electrical connection terminals during protruding, and improving the accuracy of the electrical connection terminals when protruding.

In addition, in a possible design, the position limiting parts 131 and the isolating member 13 are integrally injection molded, or the position limiting parts 131 and the isolating member 13 are fixedly connected.

An embodiment of the present application also provides a isolating member, the isolating member is set at an end of the battery module along the length direction, and along the length direction, the isolating member has an outer end surface away from the battery cells and an inner end surface close to the battery cells, the isolating member is provided with through holes, the through holes penetrate the inner end surface and the outer end surface, and the electrical connection terminal of each of the battery cells protrudes from a corresponding through hole, where the outer end surface is provided with position limiting parts.

The above descriptions are only preferred embodiments of the present application, and are not intended to limit the present application. Any modification, equivalent replacement, and improvement, etc., made within the spirit and principle of the present application shall be all included in the scope of protection of the present application.

What is claimed is:
1. A battery module, comprising:
   a plurality of battery cells that have electrical connection terminals; and
   an isolating member that is set at an end of the battery module along a length direction, wherein along the length direction, the isolating member has an outer end surface away from the battery cells and an inner end surface close to the battery cells, the isolating member is provided with through holes, the through holes penetrate the inner end surface and the outer end surface, and the electrical connection terminals of the battery cells protrude from the through holes,
   wherein the isolating member further comprises a plurality of position limiting parts configured to prevent contact of the electrical connection terminals of adjacent battery cells, the plurality of position limiting parts comprise a first position limiting part and a second position limiting part,
   the first limiting part comprises:
   a first position limiting plate protruding from the outer end surface of the isolating member in the length direction and extending in a height direction between two ends; and
   two first reinforcing plates protruding from the outer end surface of the isolating member in the length direction and extending in a width direction, wherein the two first reinforcing plates are respectively jointed to the two ends of the first position limiting plate along the length direction, the second position limiting part comprises:
a second position limiting plate protruding from the outer end surface of the isolating member along the length direction and extending in a height direction;
a third position limiting plate extending along the width direction and connected to an outer end of the second position limiting plate along the height direction, wherein the third position limiting plate is bent relative to the second position limiting plate; and
two second reinforcing plates protruding from the outer end surface of the isolating member in the length direction, wherein the two second reinforcing plates are respectively jointed to two opposing ends of the second position limiting plate along the length direction and are bent relative to the second position limiting plate, and the two second reinforcing plates are respectively jointed to the third position limiting plate along the width direction,
wherein, the third position limiting plate is bent relative to the second position limiting plate, and the two second reinforcing plates are bent relative to both the second position limiting plate and the third position limiting plate.

2. The battery module according to claim 1, wherein, along the width direction, the first position limiting plate is aligned with a side wall of the through hole.

3. The battery module according to claim 1, wherein the second position limiting part has an inclined surface between the third position limiting plate and the second position limiting plate;
one of the electrical connection terminals after protruding from the through hole is attached to the inclined surface; and
an angle between the inclined surface and the second position limiting plate is 90°-180°.

4. The battery module according to claim 1, wherein, along the width direction, the second position limiting plate is aligned with a side wall of the through hole.

5. The battery module according to claim 1, wherein the position limiting parts are set between adjacent through holes.

6. The battery module according to claim 1, wherein the through holes comprise a first end through hole, a second end through hole and middle through holes, the first end through hole and the second end through hole are located at two ends along the width direction, one or more of the middle through holes are located between the first end through hole and the second end through hole; and
one of the position limiting parts is set between the first end through hole and a middle through hole adjacent to the position limiting part, and another one of the position limiting parts is set between the second end through hole and a middle through hole adjacent to it.

7. An isolating member, the isolating member set at an end of a battery module along a length direction, and along the length direction, the isolating member has an outer end surface away from battery cells and an inner end surface close to the battery cells, the isolating member is provided with through holes, the through holes penetrate the inner end surface and the outer end surface, and an electrical connection terminal of each of the battery cells protrudes from the through hole,
wherein the isolating member further comprises a plurality of position limiting parts configured to prevent contact of the electrical connection terminals of adjacent battery cells, the plurality of position limiting parts comprise a first position limiting part and a second position limiting part, the first limiting part comprises:
a first position limiting plate protruding from the outer end surface of the isolating member in the length direction and extending in a height direction between two ends; and
two first reinforcing plates protruding from the outer end surface of the isolating member in the length direction and extending in a width direction, wherein the two first reinforcing plates are respectively jointed to the two ends of the first position limiting plate along the length direction,
the second position limiting part comprises:
a second position limiting plate protruding from the outer end surface of the isolating member along the length direction and extending in a height direction;
a third position limiting plate extending along the width direction and connected to an outer end of the second position limiting plate along the height direction, wherein the third position limiting plate is bent relative to the second position limiting plate; and
two second reinforcing plates protruding from the outer end surface of the isolating member in the length direction, wherein the two second reinforcing plates are respectively jointed to two opposing ends of the second position limiting plate along the length direction and are bent relative to the second position limiting plate, and the two second reinforcing plates are respectively jointed to the third position limiting plate along the width direction,
wherein, the third position limiting plate is bent relative to the second position limiting plate, and the two second reinforcing plates are bent relative to both the second position limiting plate and the third position limiting plate.

8. The isolating member according to claim 7, wherein, along the width direction, the first position limiting plate is aligned with a side wall of the through hole.

9. The isolating member according to claim 7, wherein the second position limiting part has an inclined surface between the third position limiting plate and the second position limiting plate;
one of the electrical connection terminals after protruding from the through hole is attached to the inclined surface; and
an angle between the inclined surface and the second position limiting plate is 90°-180°.

10. The isolating member according to claim 7, wherein, along the width direction, the second position limiting plate is aligned with a side wall of the through hole.

11. The isolating member according to claim 7, wherein the position limiting parts are set between adjacent through holes.

12. The isolating member according to claim 7, wherein the through holes comprise a first end through hole, a second end through hole and middle through holes, the first end through hole and the second end through hole are located at two ends along the width direction, one or more of the middle through holes are located between the first end through hole and the second end through hole; and
one of the position limiting parts is set between the first end through hole and a middle through hole adjacent to the position limiting part, and another one of the position limiting parts is set between the second end through hole and a middle through hole adjacent to it.

* * * * *